United States Patent [19]
Goto et al.

[11] Patent Number: 5,536,560
[45] Date of Patent: Jul. 16, 1996

[54] FILMS FOR ELECTROPHOTOGRAPHIC RECORDING AND IMAGE FORMING METHOD FOR USE WITH SAME

[75] Inventors: Miyoko Goto, Itami; Toshiyuki Sahara; Mitsuru Isogai, both of Aichi-Ken, all of Japan

[73] Assignee: Minolta Camera Kabushiki Kaisha, Osaka, Japan

[21] Appl. No.: 124,537

[22] Filed: Sep. 22, 1993

[30] Foreign Application Priority Data

Sep. 25, 1992 [JP] Japan .................................. 4-280519
Sep. 30, 1992 [JP] Japan .................................. 4-286928

[51] Int. Cl.⁶ .................................................. B32B 3/00
[52] U.S. Cl. ...................... 428/195; 428/192; 428/211; 428/220; 428/411.1; 428/480; 428/913
[58] Field of Search ............................... 428/195, 331, 428/481, 483, 486, 513, 910, 913, 914, 211, 192, 220, 411.1, 480; 503/227

[56] References Cited

U.S. PATENT DOCUMENTS

| | | | |
|---|---|---|---|
| 4,420,528 | 12/1983 | Okiyama | 428/220 |
| 4,943,555 | 7/1990 | Nakamoto et al. | 503/227 |
| 5,110,788 | 5/1992 | Katayama et al. | 503/227 |
| 5,130,189 | 7/1992 | Hart | 428/331 |

FOREIGN PATENT DOCUMENTS

| | | |
|---|---|---|
| 0403311 | 12/1990 | European Pat. Off. . |
| 0403310 | 12/1990 | European Pat. Off. . |
| 58-90647 | 5/1983 | Japan . |
| 59-7367 | 1/1984 | Japan . |
| 62-116945 | 5/1987 | Japan . |

*Primary Examiner*—Patrick J. Ryan
*Assistant Examiner*—William A. Krynski
*Attorney, Agent, or Firm*—Burns, Doane, Swecker & Mathis

[57] ABSTRACT

A transparent film used as recording media in an electrophotographic apparatus and having different expansion and shrinkage characteristics during heating in length and width directions. At the end portion of the film in the direction in which the film has slighter shrinkage is provided a non-transparent member so that the passage of the film can be detected by means of photosensors without the non-transparent member being peeled away from the film due to the differences in the shrinkage factors of the film and the non-transparent member upon fixing.

An image forming method for forming an image on the transparent film. In the above method, the transparent film is set at a supply portion of the electrophotographic apparatus so as to be fed along the direction in which the film has greater shrinkage during heating, so that the film does not jam and roll up on a fixing rollers and is allowed stable image formation.

14 Claims, 7 Drawing Sheets

FILMS FOR ELECTROPHOTOGRAPHIC RECORDING AND IMAGE FORMING METHOD FOR USE WITH SAME

BACKGROUND OF THE INVENTION

1. Field of the Invention

The present invention relates to films of the electrophotographic type comprising a transparent film used as recording media in electrophotographic recording apparatus. More specifically, the present invention relates to films of the electrophotographic type for use as recording media for image formation in electrophotographic recording apparatus for overhead projection and the like, and further relates to image forming methods for use with said films in electrophotographic apparatus.

2. Description of the Related Art

Conventionally, electrophotographic apparatus are capable of forming images on films of the electrophotographic type comprising a transparent film made of polyester or the like which are used as recording media in electrophotographic apparatus such as copying machines and which can be projected via an overhead projector and the like.

In recent years, electrophotographic apparatus such as copying machines and the like generally detect the passage of recording media by means of photosensors of the transparent or reflective types using a light source such as light-emitting diodes (LED) or the like to detect the passage of said recording media.

However, when an electrophotographic film comprising a transparent type film made of polyester or the like is used as recording media, the passage of the electrophotographic film is impossible to detect because the wave length of the light emitted from the LED or the like ranges from visible light to infrared light, such that said light is only slightly absorbed or reflected by said electrophotographic film.

Conventionally, in order to detect the passage of electrophotographic film in electrophotographic apparatus of the aforesaid type, a non-transparent member for absorbing or reflecting the light from the LED or the like is provided on a portion of said electrophotographic film, such that the passage of said electrophotographic film can be detected thereby.

Proposed methods for providing non-transparent members for absorbing or reflecting light from an LED or the like on a portion of the aforesaid electrophotographic film include methods for printing a coating on electrophotographic film which cuts 60% or more of the light emitted from an LED or the like, methods for adhering a band of paper, cloth or the like on electrophotographic film, and methods for forming a metallic vacuum deposition layer to block the light of an LED or the like.

When image formation is accomplished via an electrophotographic apparatus using the previously mentioned electrophotographic film with adhered band of paper, cloth or the like, and the toner image formed on said electrophotographic film is fixed on said film via a fixing device of the heat-pressure type, a portion of the aforesaid paper, cloth or the like adhered to the film peels away from the film due to differences in the shrinkage factors of the electrophotographic film and said paper or cloth. This situation is disadvantageous in that it produces problems in discharging the electrophotographic film.

On the other hand, in forming images on electrophotographic film used in electrophotographic apparatus such as copying machines and the like, the electrophotographic film is fed into the electrophotographic apparatus and toner images are typically formed on said film via an electrophotographic process. Thereafter, the film is guided to a fixing device which utilizes a fixing roller comprising a heating roller or the like, such that the toner image formed on said film is fused thereon via the fixing device, thereby producing the toner image on the electrophotographic film.

Figure 7:
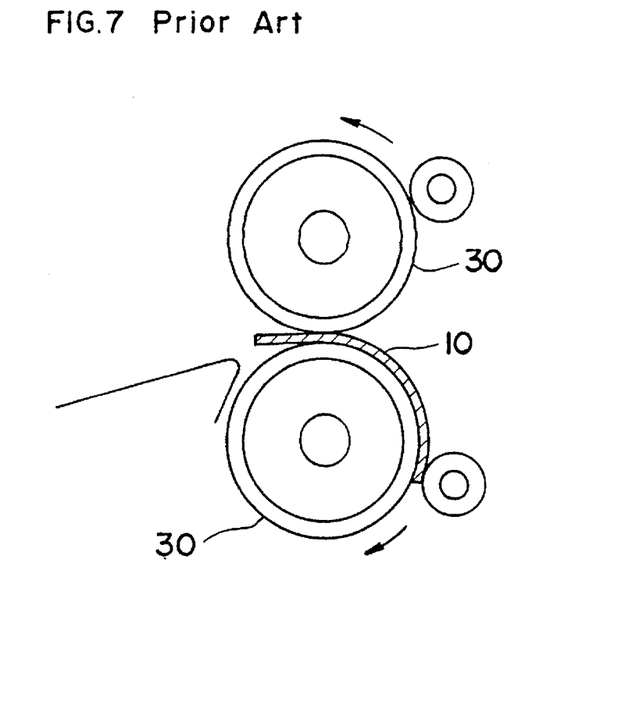
FIG. 7 is a side view of the prior art showing the electrophotographic film rolled up on the fixing roller when the toner image formed on said film is fixed via said fixing roller.
Figure 8:
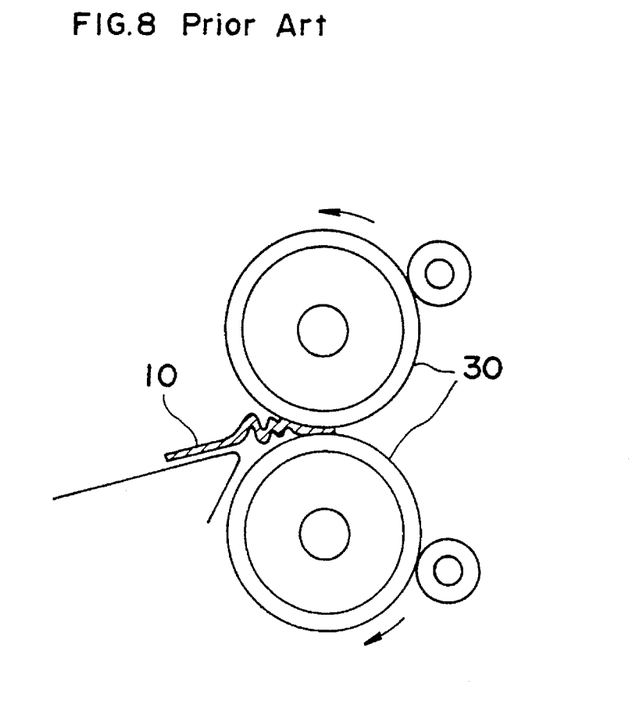
FIG. 8 is a side view of the prior art showing electrophotographic film failing to be inserted between the fixing rollers and jamming when the toner image formed on said film is fixed via said fixing roller.

When film is fed into the electrophotographic apparatus for image formation in the manner described above, the film is softened via the heat applied by the fixing device on said film when the toner image formed on the film is fused thereon by the fixing device. This situation is disadvantageous inasmuch as the electrophotographic film 10 may become rolled up on the surface of the fixing roller 30, as shown in FIG. 7, or the electrophotographic film 10 may not properly feed between the fixing rollers 30, as shown in FIG. 8, such that, in either case, the electrophotographic film 10 becomes jammed within the apparatus.

Various research has been conducted heretofore in regards to means for preventing the electrophotographic film from becoming rolled up on the fixing roller, and improper feeding of the electrophotographic film between the fixing rollers as previously described. For example, one method proposes the electrophotographic film may be constructed so as to have greater thickness, or, other method proposes the electrophotographic film may be formed of heat-resistant synthetic resins.

When the electrophotographic film is constructed so as to have greater thickness, however, certain other disadvantages arise inasmuch as the transparency of said film is reduced, such that when images are formed on said film and projected via overhead projector and the like, the projected image is difficult to see. Furthermore, thermal efficiency is reduced when the toner image is fixed on the electrophotographic film, such that inadequate fusion of the toner image on the electrophotographic film results.

Additionally, still further disadvantages arise when a heat-resistant synthetic resin film is used as the electrophotographic film inasmuch as the transparency of the electrophotographic film is adversely affected due to the typically poor transparency of the heat-resistant resin itself. Furthermore, when images are formed on said film and projected via overhead projector and the like, the projected image is difficult to see in much the same manner as described for film of greater thickness.

In recent years, unique electrophotographic film has been developed wherein said film comprises polyethylene-2,6-naphthalate film having a saturation-contraction ratio of less than 0.3% on both the horizontal and vertical at 180° C., and Young's modulus of 600 Kg/mm$^2$ or greater on both the horizontal and vertical.

The aforesaid film having the previously described physical properties is unique, and, therefore, expensive. Furthermore, the aforesaid unique film cannot sufficiently eliminate the previously mentioned disadvantages when used as an electrophotographic film for image formation, i.e., the problems of the electrophotographic film becoming rolled up on the fixing roller, and improper feeding of the electrophotographic film between the fixing rollers.

SUMMARY OF THE INVENTION

A main object of the present invention is to provide an electrophotographic film for normally forming excellent images, and method for forming images on said electrophotographic film.

A further object of the present invention is to provide an electrophotographic film which allows reliable detection of its passage within the electrophotographic apparatus, and can be discharged from the electrophotographic apparatus after image formation.

A still further object of the present invention is to provide an electrophotographic film which allows easy selection of a placement direction relative to the electrophotographic apparatus, which allows reliable fixing of toner images, and method for forming images on said film.

These aforesaid objects of the invention are further achieved by providing a transparent film used as recording media in an electrophotographic apparatus, said film comprising:

a first end portion in a length direction having predetermined expansion and shrinkage characteristics during heating;

a second end portion in a width direction having different expansion and shrinkage characteristics during heating from said first end portion; and a non-transparent member adhered to the end portion which has slighter heat-shrinkage rate.

The aforesaid objects of the invention are achieved by providing a transparent film used as recording media in an electrophotographic apparatus, said film comprising:

a first end portion in a lengthwise direction having predetermined expansion and shrinkage characteristics during heating;

a second end portion in a width direction having different expansion and shrinkage characteristics during heating from said first end portion; and a indication for indicating the end portion having greater shrinkage during heating of the first and second end portions.

The aforesaid objects of the invention are further achieved by performing a method comprising the steps of:

setting the transparent film at a supply portion of the electrophotographic apparatus so as to be fed along the direction in which the film has greater shrinkage during heating; and forming the image on the transparent film fed into the electrophotographic apparatus.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

The preferred embodiments of the electrophotographic film of the present invention are described below in specific detail. Furthermore, the excellence of the electrophotographic film of these embodiments used in image formation with an electrophotographic apparatus is elucidated with reference to reference example films.

Embodiments 1–4

In the first through fourth embodiments of the present invention, four types of polyester film are used as films having transparent qualities, A4 in size and 100 µm in thickness, and having heat-shrinkage rates in the lengthwise direction (long side) and widthwise direction (short side) as listed in Table 1.

TABLE 1

|  |  | Emb. 1 | Emb. 2 | Emb. 3 | Emb. 4 |
|---|---|---|---|---|---|
| Heat-shrinkage (%) | Length Direction | −0.12 | −0.10 | −0.10 | −0.20 |
|  | Width Direction | +0.16 | −0.06 | −0.07 | −0.03 |

The heat-shrinkage rates in the length direction and width direction of each of the aforesaid films was measured in the manner described below.

Figure 1:
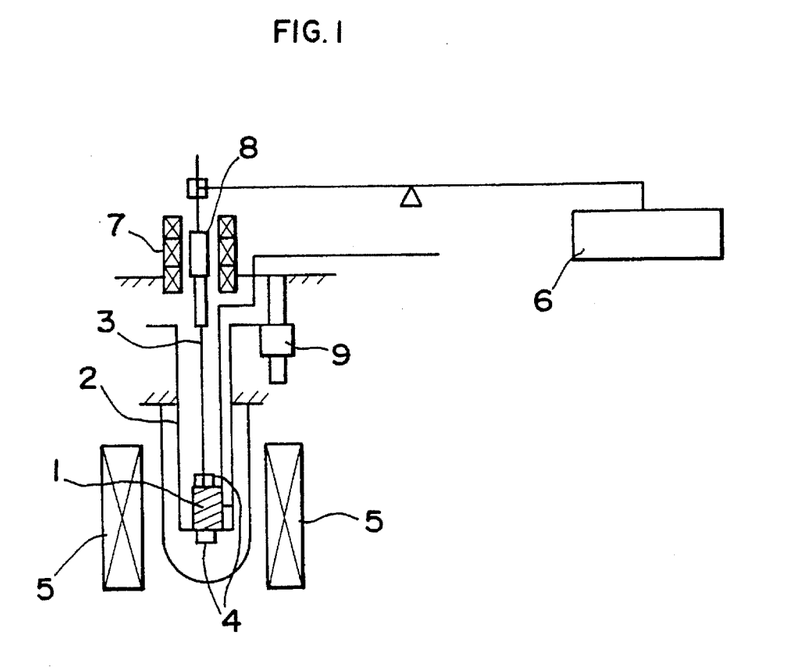
FIG. 1 is an illustration briefly showing the measurement of the heat shrinkage rate of the electrophotographic film using a thermal-stress deformation measuring device.
Figure 2:
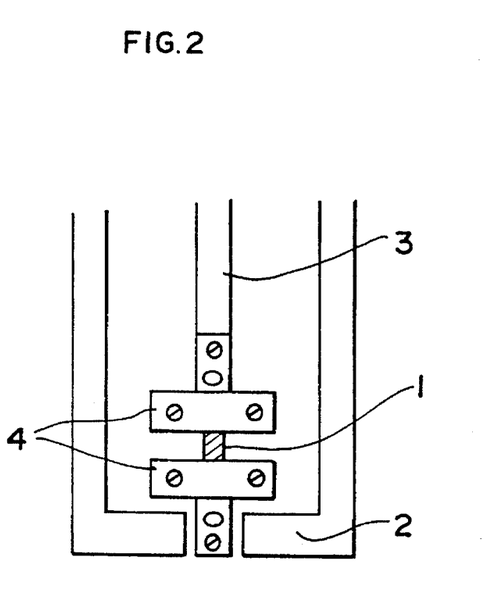
FIG. 2 is a partial view showing a piece of the electrophotographic film gripped by a work holding device to be measured for thermal-stress distortion using a thermal-stress deformation measuring device.
Figure 3:
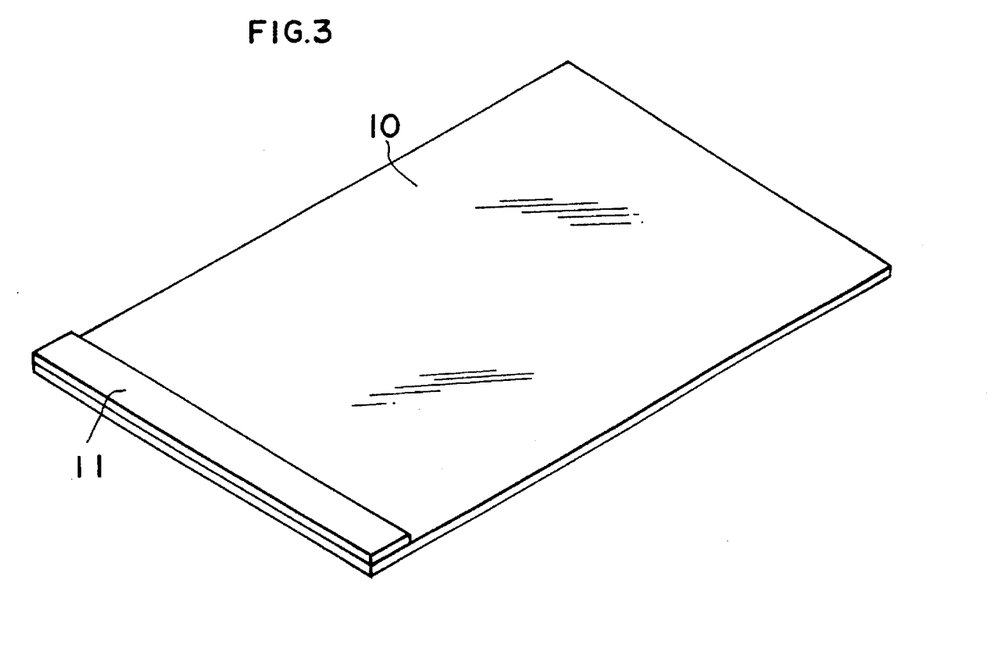
FIG. 3 is a perspective view showing the electrophotographic film with a non-transparent member adhered at one end of the polyester film along the width direction.

Each of the polyester films were cut into pieces of film measuring 10.4 mm×5 mm in the length and width directions. As shown in FIGS. 1 and 2, these cut film pieces 1 were placed in a chuck 4 attached to a probe 3 and a sample holder 2 of a thermal-stress distortion measuring device (model TMA/SS 120, Seiko Denshi Kogyo K.K.) with a measurement length of 10 mm.

With the film piece 1 gripped by the chuck 4, the film 1 is subjected to heat and force applied via the heater 5 and the force generating portion 6. Heat was applied from room temperature to 200° C. at a temperature elevation rate of 5° C. per minute, and the load-sine wave mode was used with a load of 1±1 g per film piece 1 at a frequency of 0.02 Hz. The change in length of each film piece 1 was measured by micrometer 9 via differential transistors 7 and core 8 individually connected to the sample holder 2 and probe 3.

The length L1 of each film piece 1 was measured at a load of 0 g and temperature of 100° C., and the difference was calculated between this length L1 value and the length L0 of each film piece 1 measured at room temperature. Then, the heat-shrinkage rates in the length direction and width direction were calculated for the polyester films using the equation below.

Heat-shrinkage rate (%)=[(L1−L0)/L0]×100 The various polyester films used in the aforesaid embodiments had only slight shrinkage due to heating in the width direction compared to that in the length direction, as shown in Table 1.

In the electrophotographic films 10 of the aforesaid embodiments, a band of paper having a thickness of 80 μm is used as a non-transparent member 11 and adhered via an adhesive agent along the width direction of one end of said polyester film having slight shrinkage during heating.

Embodiments 5~8

In the present embodiments, the same polyester films are used in the fifth and first embodiments, sixth and second embodiments, seventh and third embodiments, and eighth and fourth embodiments.

The electrophotographic film 10 of the present embodiments also utilizes a band of paper having a thickness of 80 μm as a non-transparent member 11 adhered via an adhesive agent along the width direction of one end of said polyester film having slight shrinkage during heating.

Reference Examples 1~4

In the present reference examples, four types of polyester films are used as films having transparent qualities, A4 in size and 100 μm in thickness, and having heat-shrinkage rates in the length direction and width direction as listed in Table 2. The heat-shrinkage rates of the present polyester films were measure din the same manner as described for the aforesaid first through fourth embodiments.

TABLE 2

|  |  | Ref. 1 | Ref. 2 | Ref. 3 | Ref. 4 |
|---|---|---|---|---|---|
| Heat-shrinkage (%) | Length Direction | +0.16 | −0.06 | −0.07 | −0.03 |
|  | Width Direction | −0.12 | −0.10 | −0.10 | −0.20 |

The various polyester films used in the above reference examples have shrinkage during heating that is greater in the width direction compared to that of the length direction, as shown in Table 2.

In the electrophotographic films 10 of the present reference examples, a band of adhesive paper having a thickness of 80 μm is used as a non-transparent member 11 adhered along the width direction of one end of said polyester film having major shrinkage during heating.

Reference Examples 5~8

In the present reference examples, the same polyester films are used in the fifth and first reference examples, sixth and second reference examples, seventh and third reference examples, and eighth and fourth reference examples.

The electrophotographic film 10 of the present reference examples utilizes a band of adhesive paper having a thickness of 80 μm as a non-transparent member 11 adhered along the width direction of one end of said polyester film having major shrinkage during heating.

Then, the first through eighth embodiments and the first through eighth reference examples of the electrophotographic film were used for image formation using a commercial full color copying machine (model CF70, Minolta Camera Co., Ltd.). The transport condition of each electrophotographic film, and post-image formation condition of each electrophotographic film was examined.

Figure 4:
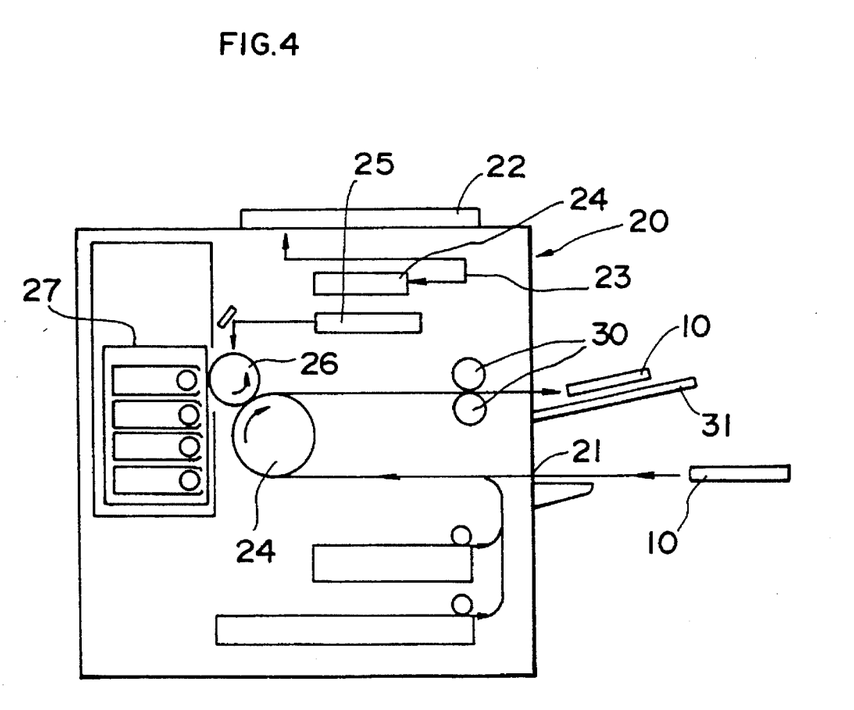
FIG. 4 is an illustration briefly showing the electrophotographic film in the image forming state using a copying machine.
Figure 5:
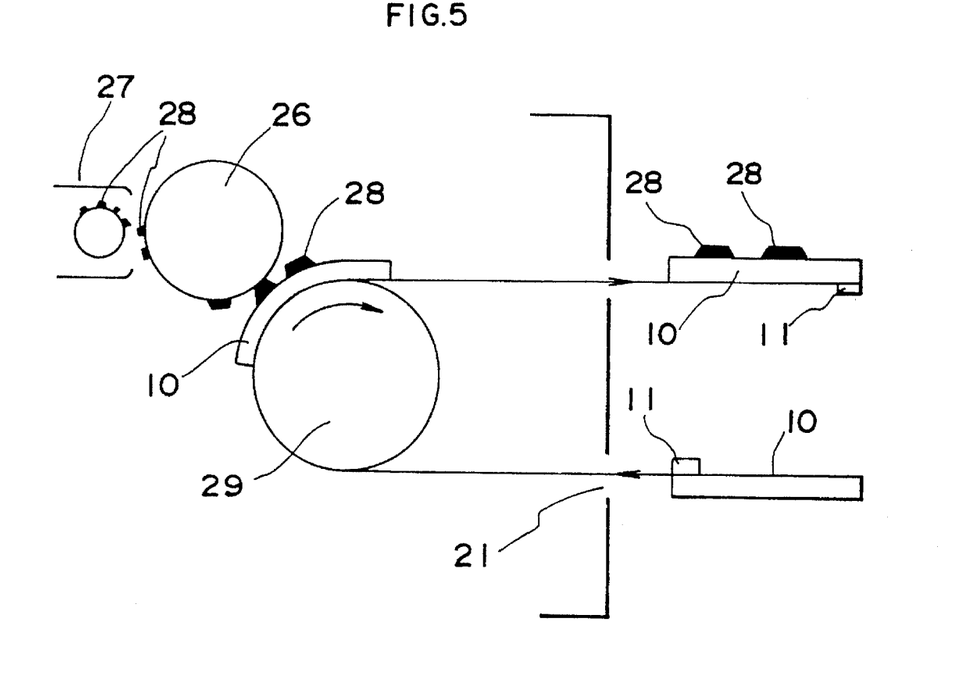
FIG. 5 is a partial view showing the electrophotographic film being transported during the image formation using a copying machine.

Each of the aforesaid electrophotographic films was used for image formation with the previously mentioned copying machine. As shown in FIGS. 4 and 5, the electrophotographic film 10 is provided with a non-transparent member 11 adhered to the leading end thereof in the transport direction, said non-transparent member 11 being adhered to the surface of said film on the reverse side to that used for image formation. The electrophotographic film 10 is set at a supply aperture 21 of the copying machine 20.

An original document (not illustrated) is set on the document table 22 of the copying machine 20 and read via an optical unit 23. The read data are input to the reading section 24, and a laser beam emitted from the laser output section 25 irradiates the surface of the photosensitive member 26 based on the aforesaid data input to the reading section 24, thereby forming an electrostatic latent image corresponding to the original document on the surface of the photosensitive member 26. Thereafter, toner is supplied from the developing device 27 to the photosensitive member 26, so as to form a toner image on the surface of the photosensitive member 26.

On the other hand, the electrophotographic film 10 previously set at the supply aperture 21 is introduced into the copying machine 20, and adhered to the transfer drum 29. In this state, the toner image formed on the surface of the photosensitive member 26 is transferred to the surface of the electrophotographic film 10 on the reverse side to the side provided with the non-transparent member 11 adhered thereon.

After the toner image is transferred onto the electrophotographic film 10, said film 10 is guided between a pair of fixing rollers 30, which apply heat and pressure thereon. After the toner image is fused onto the surface of the electrophotographic film 10 at a fixing temperature of 160° C., the electrophotographic film 10 is discharged to a discharge tray 31.

When the electrophotographic films 10 of the aforesaid first through eighth embodiments and first through eighth reference examples were subjected to image formation using the previously mentioned copying machine 20, it was found that the electrophotographic films of the first through eighth embodiments maintained the non-transparent member 11 adhered thereto after the fixing process, without said non-transparent member 11 exhibiting any separation from said electrophotographic film 10. The fixed electrophotographic films 10 were smoothly discharged to the discharge tray 31 in the aforesaid state, and produced no discharge irregularities.

Figure 6:
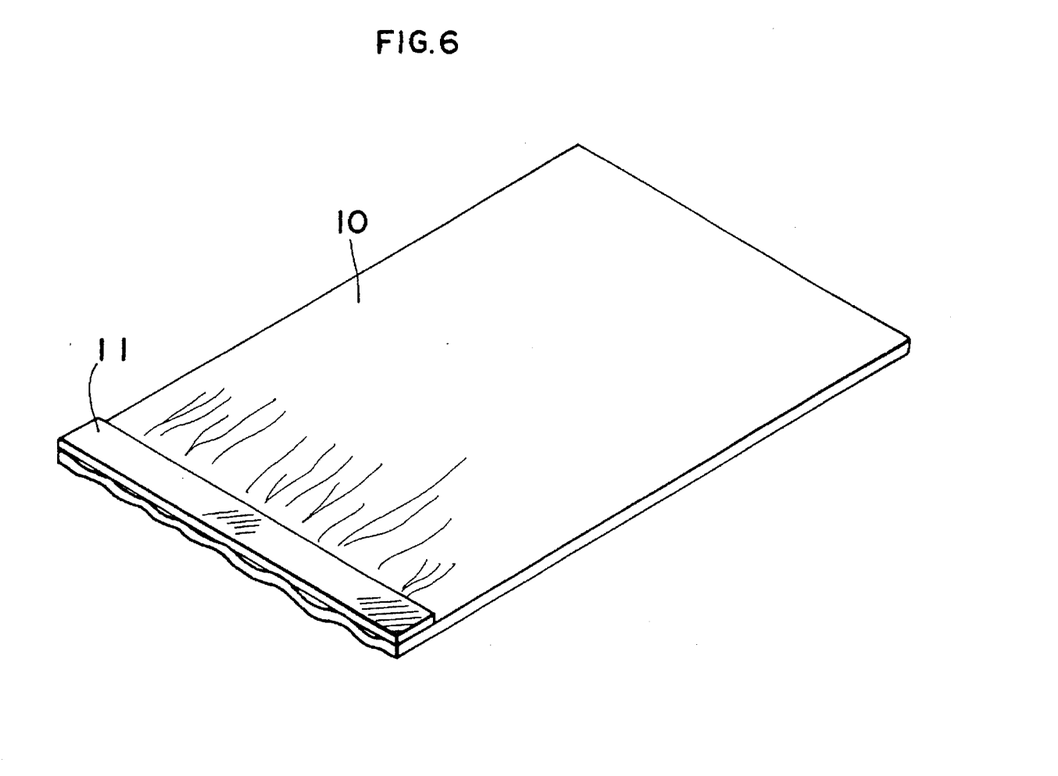
FIG. 6 is a brief perspective view showing a comparison electrophotographic film after image formation using a copying machine.

When, however, the electrophotographic films 10 of the aforesaid first through eighth reference examples were subjected to image formation, it was found that the edge portion of said electrophotographic films 10 having the non-transparent member 11 adhered thereto was rippled after the fixing process, such that parts of the non-transparent member 11 were separating from said film 10, as shown in FIG. 6. As a result, these electrophotographic films 10 did not smoothly discharge to the discharge tray 31, and caused discharge irregularities.

Subsequent to the previously described image formation, the electrophotographic films 10 were used in projections via an overhead projector. The electrophotographic films 10 of the first through eighth embodiments produced clear projection images because they remained in a smooth, flat condition after image formation, whereas the electrophotographic films 10 of the first through eighth reference examples did not produce clear projection images due to the rippled edge of said electrophotographic film 10 having the non-transparent member 11 adhered thereto which produced undulations in parts of the film 10 disposed on the surface of the projector and caused shadows to appear in the projection image arising from said undulations.

The ninth through twelfth embodiments of the electrophotographic film of the present invention are described in detail hereinafter. The following description pertains specifically to the use of these electrophotographic films in image formation via an electrophotographic apparatus.

Embodiment 9

In the present embodiment, four types of polyester film F-1 through F-4 are used as electrophotographic films having transparent qualities, A4 in size and 100 μm in thickness, and having glass transition points and heat-shrinkage rates in the length direction and width direction as listed in Table 3.

TABLE 3

| Film | Heat-shrinkage Rate | | Glass Transition Point |
|---|---|---|---|
| | A4 Length | A4 Width | |
| F-1 | +0.16% | −0.12% | 67° C. |
| F-2 | −0.03% | −0.06% | 90° C. |
| F-3 | −0.07% | −0.10% | 86° C. |
| F-4 | −0.03% | −0.20% | 86° C. |

The heat-shrinkage rates of the aforesaid polyester films F-1 through F-4 in the length and width directions were measured. The measurement method used was identical to that previously described for the polyester films of the first through fourth embodiments, and a full description of said measurement method is, therefore, omitted herefrom.

As shown in Table 3, the polyester films F-1 through F-4 used in the present embodiment have shrinkage during heating which is greater in the A4 width direction than in the A4 length direction.

Figure 9:
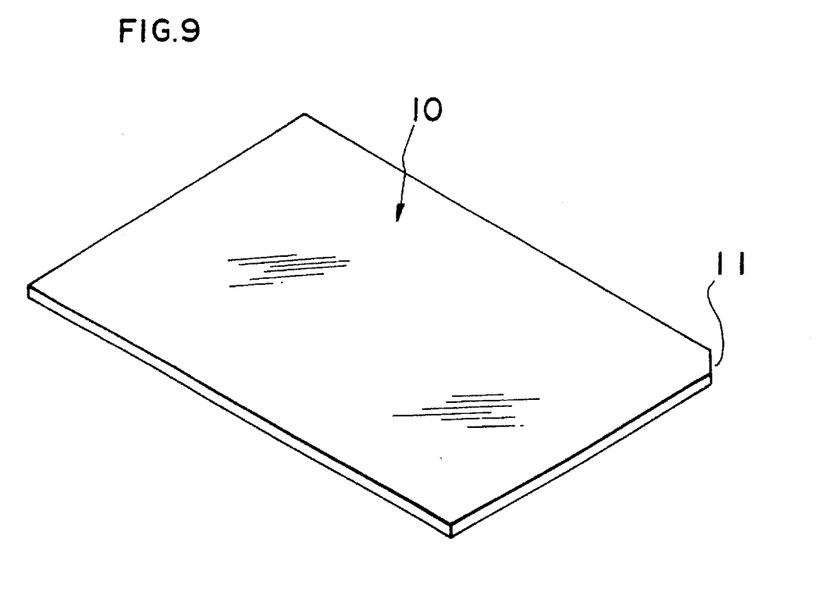
FIG. 9 is a perspective view showing a notch provided in one corner of the electrophotographic film as an indication for indicating the magnitude of shrinkage during heating in the length and width directions of the electrophotographic film of the ninth and eleventh embodiments of the invention.

In the present embodiment, the electrophotographic films 10 using the aforesaid polyester films F-1 through F-4 are provided with a notch 11 at one corner of said electrophotographic film 10 as an indication 11 for indicating the magnitude of the shrinkage during heating in the length and width directions, as shown in FIG. 9.

The aforesaid electrophotographic films comprising the polyester films F-1 through F-4 were used in image formation via an electrophotographic apparatus.

Then, present embodiment of the electrophotographic film using the polyester films F-1 through F-4 were used for image formation using a commercial full color copying machine (model CF70, Minolta Camera Co., Ltd.), as shown in FIG. 4. The fixing rollers 30 used in the copying machine 20 were of a type which typically provide excellent insertability of the electrophotographic film 10. More specifically, the top roller 30a comprised a fluoroplastic roller having an expanded barrel-shaped center portion and with a major diameter of 60 mm, and the bottom roller 30b comprised a straight-shaped roller having a uniform diameter of 60 mm and formed of silicon rubber protected by teflon tubing. The aforesaid fixing rollers 30 were coated with slight amount of silicon oil to enhance the insertion of the electrophotographic film therebetween, and additional silicon oil in the amount of 1 mg was applied to said fixing rollers 30 with the passage of each sheet of electrophotographic film 10 therebetween. The fixing temperature of the aforesaid fixing rollers 30 was set at 160° C.

Figure 11:
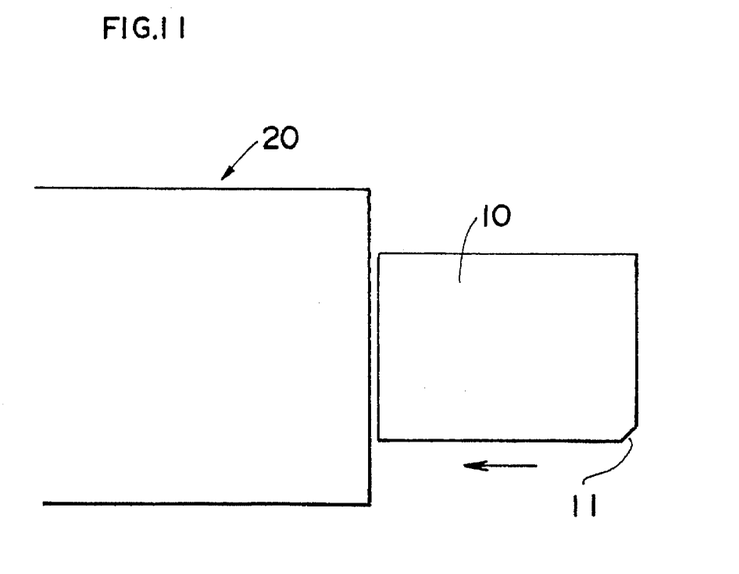
FIG. 11 is a top plan view showing the electrophotographic film set in the feed portion of the copying machine in the ninth and eleventh embodiments of the invention.

The electrophotographic films 10 having greater shrinkage during heating in the width direction than in the length direction were used in image formation via a copying machine using the aforesaid fixing rollers having excellent insertability of the electrophotographic film 10 as previously described. As shown in FIGS. 4, 5 and 11, the electrophotographic film 20 is set at the supply aperture 21 of the copying machine 20 with the notch 11 provided on the trailing end of said film in the transport direction with edges of said film 20 in the A4 width direction positioned at front and back in the transport direction, such that the electrophotographic film 10 was fed into the copying machine 20 in the A4 lengthwise direction of the film having slight shrinkage during heating in the length direction.

An original document (not illustrated) is set on the document table 22 of the copying machine 20 and read via an optical unit 23. The read data are input to the reading section 24, and a laser beam emitted from the laser output section 25 irradiates the surface of the photosensitive member 26 based on the aforesaid data input to the reading section 24, thereby forming an electrostatic latent image corresponding to the original document on the surface of the photosensitive member 26.

On the other hand, the electrophotographic film 10 previously set at the supply aperture 21 is introduced into the copying machine 20, and adhered to the transfer drum 29. In this state, the toner image formed on the surface of the photosensitive member 26 is transferred to the surface of the electrophotographic film 10 on the reverse side to the side provided with the non-transparent member 11 adhered thereon.

Figure 10:
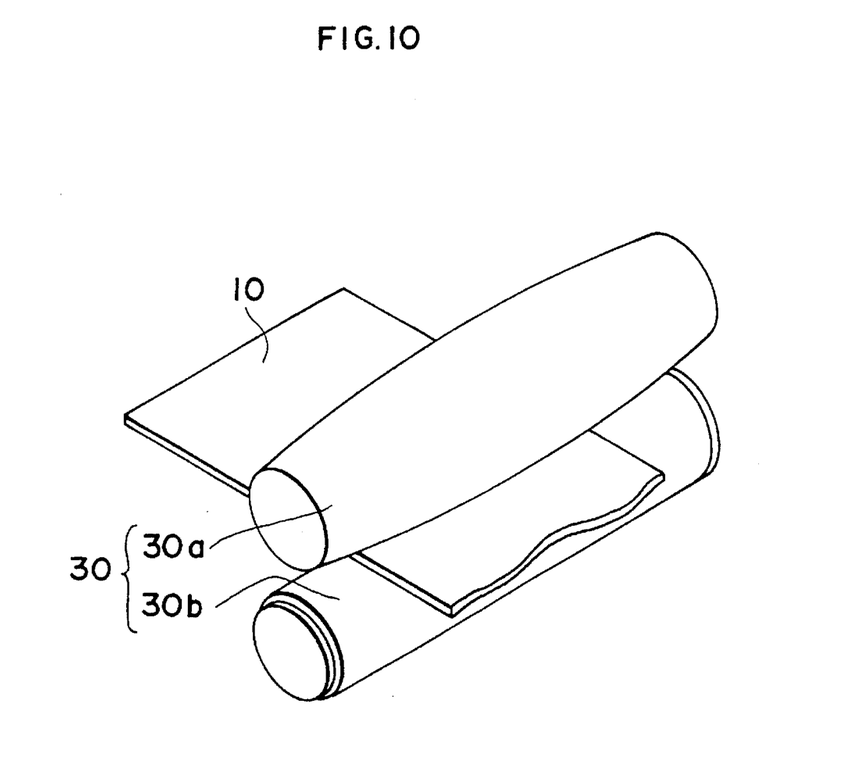
FIG. 10 is a perspective view showing the electrophotographic film in the state of receiving pressure and heat via the fixing rollers when an image is formed on said film using a copying machine in the ninth and tenth embodiments of the invention.

After the toner image is transferred onto the electrophotographic film 10, said film 10 is guided between a top roller 30a and bottom roller 30b comprising the fixing roller 30, which apply heat and pressure thereon. After the toner image is fused onto the surface of the electrophotographic film 10, the electrophotographic film 10 is discharged to a discharge tray 31.

When the electrophotographic film 10 having greater shrinkage during heating in the width direction than the length direction was used for image formation, the edge portions of the film 10 in the A4 width direction shrank due to the heat of the fixing rollers 30, but said electrophotographic film 10 inserted smoothly between the fixing rollers 30 due to the excellent insertability of the fixing rollers relative to said film 10. Furthermore, the electrophotographic film 10 did not jam, and allowed stable image formation.

Embodiment 10

In the present embodiment, four types of polyester film F-1 through F-4 are used as electrophotographic films having transparent qualities, A4 in size and 100 μm in thickness, and are similar to those of the ninth embodiment. These electrophotographic films 10 have heat-shrinkage rates greater in the width direction than in the length direction.

Figure 12:
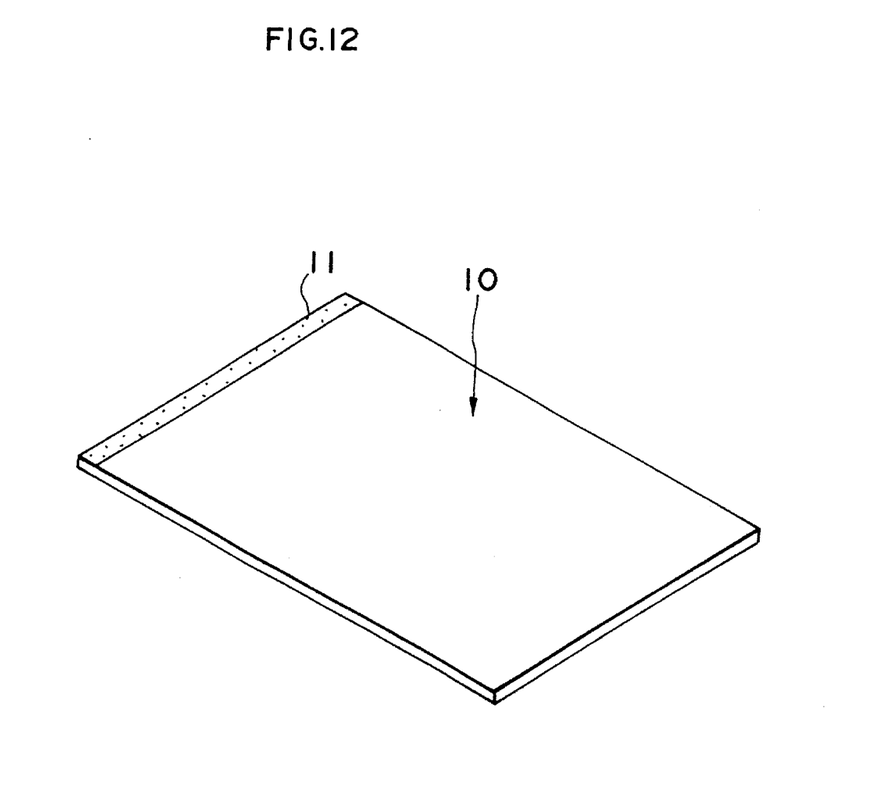
FIG. 12 is a perspective view showing an electrophotographic film provided with a coating layer on one edge along the film width direction used as an indication for indicating the magnitude of shrinkage during heating in the length and width directions of the electrophotographic film of the tenth and twelfth embodiments of the invention.

In the present embodiment, the electrophotographic film 10 using the aforesaid polyester films F-1 through F-4 are provided with an indication 11 for indicating the magnitude of the shrinkage during heating in the length direction and width direction. As shown in FIG. 12, a band-like coating layer 11 is formed along the A4 width direction having greater shrinkage during heating. This band-like coating layer 11 is formed of gravure ink containing titanium oxide on one edge portion of the electrophotographic film 10.

When the aforesaid electrophotographic films 10 were used for image formation, the same copying machine described in the first embodiment was used as the electrophotographic apparatus. The fixing rollers having identical insertability to that of the fixing rollers of the first embodiment were also used.

Figure 13:
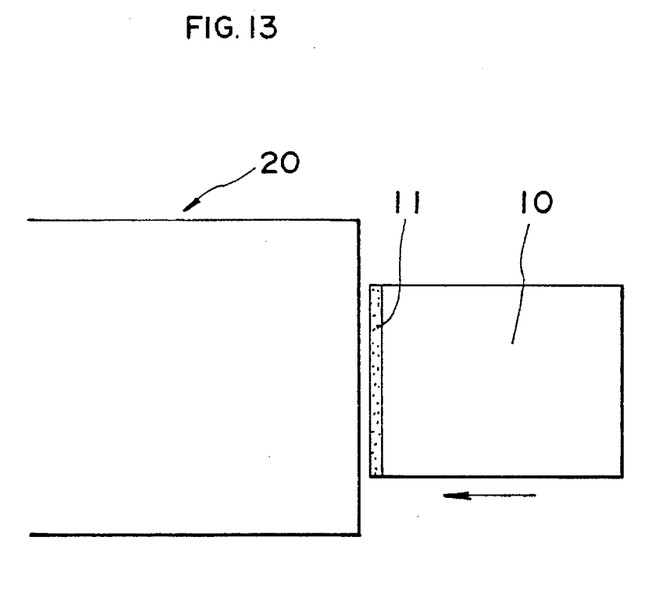
FIG. 13 is a top plan view showing the electrophotographic film set in the feed portion of the copying machine in the tenth and twelfth embodiments of the invention.

The electrophotographic film 10 was set in the copying machine 20 so as to be fed into said copying machine 20 along the A4 length direction of said film 10 having slight shrinkage during heating. As shown in FIG. 13, the electrophotographic film 10 was positioned with the edges in the A4 width direction at front and back in the transport direction, with the aforesaid coating layer 11 disposed at the leading end in the transport direction. Thereafter, image formation using the electrophotographic film 10 was identical to the processing described in the first embodiment.

When the aforesaid electrophotographic film 10 having greater shrinkage during heating in the width direction than the length direction was used for image formation, the film 10 was smoothly inserted between the fixing rollers 30 without jamming. Furthermore, the electrophotographic film 10 did not roll up on the fixing roller 30, and allowed stable image formation, in the same manner as did the first embodiment.

Embodiment 11

In the present embodiment, four types of polyester film F-5 through F-8 are used as electrophotographic films having transparent qualities, A4 in size and 100 μm in thickness, and having glass transition points and heat-shrinkage rates in the length direction and width direction as listed in Table 4. The heat shrinkage rate of each polyester film F-5 through F-8 was measured in the same manner as described in the ninth embodiment.

TABLE 4

| Film | Heat-shrinkage Rate | | Glass Transition Point |
|------|---------------------|---|------------------------|
|      | A4 Length | A4 Width |  |
| F-5 | −0.12% | +0.16% | 67° C. |
| F-6 | −0.06% | −0.03% | 90° C. |
| F-7 | −0.10% | −0.07% | 86° C. |
| F-8 | −0.20% | −0.03% | 86° C. |

The heat-shrinkage rates of the aforesaid polyester films F-5 through F-8 were greater in the A4 length direction than the A4 width direction, as shown in Table 4.

In the present embodiment, the electrophotographic film 10 of the aforesaid polyester films F-5 through F-8 is provided with a notch 11 on one corner thereof as an indication 11 for indicating the magnitude of the shrinkage during heating in the length direction and width direction, in the same manner as in the ninth embodiment.

When the aforesaid electrophotographic films 10 comprising the aforesaid polyester films F-5 through F-8 were used for image formation, the same copying machine was used as described in the ninth and tenth embodiments, but fixing rollers 30 having typically excellent dischargability relative to the electrophotographic film 10 were used as the fixing rollers for fixing the toner image on the surface of said film 10. More specifically, rubber rollers are used comprising the top roller 30a and bottom roller 30b having uniform diameters of 30 mm. The aforesaid fixing rollers 30 were coated with an amount of silicon oil to enhance the insertion of the electrophotographic film therebetween, and additional silicon oil in excess of the amounts -described in the aforesaid ninth and tenth embodiments, i.e., in the amount of 15 mg, was applied to said fixing rollers 30 with the passage of each sheet of electrophotographic film 10 therebetween. The fixing temperature of the aforesaid fixing rollers 30 was set at 160° C., as previously described in the ninth embodiment.

The electrophotographic films 10 having greater shrinkage during heating in the length direction than in the width direction were used in image formation via a copying machine using the aforesaid fixing rollers having excellent dischargability of the electrophotographic film 10 as previously described. As shown in FIGS. 4, 5 and 11, the electrophotographic film 20 is set at the supply aperture 21 of the copying machine 20 with the notch 11 provided on the trailing end of said film in the transport direction with edges of said film 20 in the A4 width direction positioned at front and back in the transport direction, such that the electrophotographic film 10 was fed into the copying machine 20 in the A4 lengthwise direction of the film having greater shrinkage during heating in the length direction.

Figure 14:
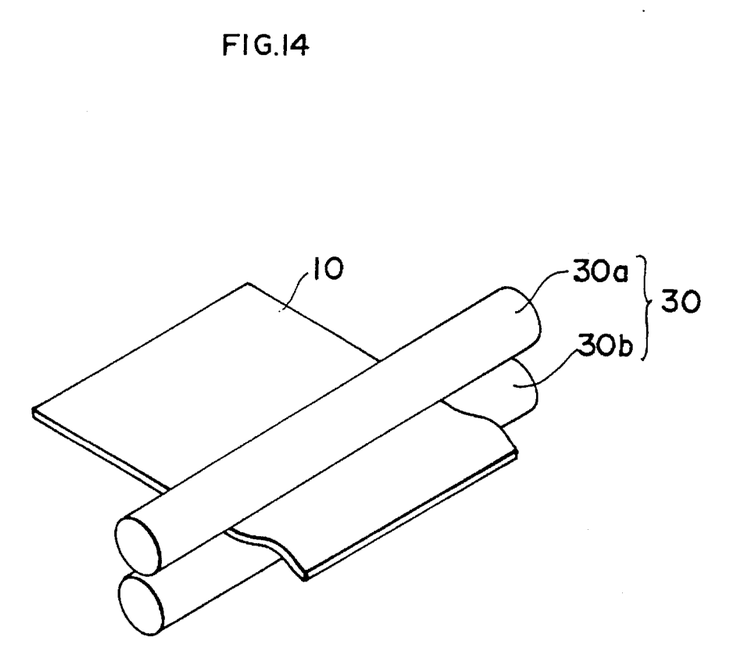
FIG. 14 is a perspective view showing the electrophotographic film in the state of receiving pressure and heat via the fixing rollers when an image is formed on said film using a copying machine in the eleventh and twelfth embodiments of the invention.

After the toner image is transferred onto the electrophotographic film 10, said film 10 is guided between a top roller 30a and bottom roller 30b comprising the fixing roller 30, which apply heat and pressure thereon, as shown in FIG. 14. After the toner image is fused onto the surface of the electrophotographic film 10, the electrophotographic film 10 is discharged to a discharge tray 31 in the same manner as described in the ninth embodiment.

When the electrophotographic film 10 having greater shrinkage during heating in the length direction than the width direction was used for image formation, the edge portions of the film 10 shrank slightly due to the heat of the fixing rollers 30, but said electrophotographic film 10 inserted smoothly between the fixing rollers 30 because said electrophotographic film 10 was inserted between the fixing rollers 30 from the edges on the A4 width direction having slight shrinkage during heating. Furthermore, the electrophotographic film 10 did not jam, and although the film 10 shrank in the length direction due to the heat of the fixing rollers 30, said film 10 did not roll up on the fixing rollers 30 and allowed stable image formation due to the excellent dischargability of said electrophotographic film 10 relative to the fixing rollers 30.

Embodiment 12

In the present embodiment, four types of polyester film F-5 through F-8 are used as electrophotographic films having transparent qualities, and are similar to those of the eleventh embodiment. The heat shrinkage rate of each polyester film F-5 through F-8 was greater in the length direction than in the width direction.

The electrophotographic film 10 of the aforesaid polyester films F-5 through F-8 of the present embodiment is provided with a notch 11 as a display portion 11 for indicating the magnitude of the shrinkage during heating in the length direction and width direction. Furthermore, a band-like coating layer member 11 of gravure ink containing titanium oxide is formed on one edge portion of the electrophotographic film 10 in the A4 width direction, in the same manner as described in the tenth embodiment.

When the electrophotographic film 10 of the present embodiment was used for image formation, the copying machine 20 of the ninth through eleventh embodiments was used as the electrophotographic apparatus, and the fixing roller of the eleventh embodiment having excellent dischargability relative to the film 10 was used as the fixing roller for fixing the toner image on the surface of the electrophotographic film 10.

The electrophotographic film 10 was placed on the copying machine 20 so as to be fed into the copying machine 20 along the A4 length direction having greater shrinkage during heating, in the same manner as described in the eleventh embodiment. As shown in FIG. 13, the electrophotographic film 10 was positioned with the edges in the A4 width direction at front and back in the transport direction, and thereafter, the film 10 was used for image formation in the same manner as described in the eleventh embodiment.

When the electrophotographic film 10 having greater shrinkage during heating in the length direction than the width direction was used for image formation, the edge portions of the film 10 in the A4 width direction inserted smoothly between the fixing rollers 30, just as previously described in the eleventh embodiment. Furthermore, the electrophotographic film 10 did not jam, said film 10 did not roll up on the fixing rollers 30 and allowed stable image formation.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A transparent film useful as recording media in an electrophotographic apparatus, said film comprising:
   a first end portion in a length direction which shrinks during heating;
   a second end portion in a width direction having a different shrinkage rate during heating than said first end portion; and
   a non-transparent member adhered to a side of the end portion which has a lower shrinkage rate than the other end portion of said transparent film.

2. A transparent film as claimed in claim 1 wherein the transparent film is formed of polyester.

3. A transparent film as claimed in claim 1 wherein said non-transparent member is a strip of adhesive paper.

4. A transparent film useful as recording media in an electrophotographic apparatus, said film comprising:
   a first end portion in a length direction which shrinks during heating;
   a second and portion in a width direction having a different shrinkage rate during heating than said first end portion; and
   an indicator which indicates the end portion having greater or smaller shrinkage during heating than the other end portion.

5. A transparent film as claimed in claim 4 wherein said indicator comprises a notch provided at one corner of the film.

6. A transparent film as claimed in claim 4 wherein said indicator comprises a coating layer formed along the end portion which has greater shrinkage during heating than the other end portion.

7. A transparent film as claimed in claim 1 wherein said shrinkage during heating of said first end portion is greater than said shrinkage during heating of said second end portion.

8. A transparent film useful as recording media in an electrophotographic apparatus, said film shrinking in a first direction at a higher rate than a second direction which is perpendicular to the first direction during heating, and comprising:
   a first end portion in the first direction;
   a second end portion in the second direction; and
   a non-transparent member adhered to a side of the second end portion of said transparent film.

9. A transparent film as claimed in claim 8 wherein the transparent film is formed of polyester.

10. A transparent film as claimed in claim 8 wherein said non-transparent member is a strip of adhesive paper.

11. A transparent film as claimed in claim 8 wherein said transparent film expands in the second direction during heating.

12. A transparent film useful as recording media in an electrophotographic apparatus, said film comprising:
   a first end portion in the first direction which shrinks during heating;
   a second end portion in the second direction which expands during heating; and
   a non-transparent member adhered to a side of the second end portion of said transparent film.

13. A transparent film as claimed in claim 12 wherein the transparent film is formed of polyester.

14. A transparent film as claimed in claim 12 wherein said non-transparent member is a strip of adhesive paper.

* * * * *